April 30, 1935.  R. E. RATHBURN  1,999,945
STORAGE BATTERY
Filed June 6, 1933  2 Sheets-Sheet 1

Inventor
Raymond E. Rathburn
By Clarence A. O'Brien
Attorney

April 30, 1935.                R. E. RATHBURN                1,999,945
                                STORAGE BATTERY
                              Filed June 6, 1933         2 Sheets-Sheet 2

Inventor
Raymond E. Rathburn
By Clarence A. O'Brien
Attorney

Patented Apr. 30, 1935

1,999,945

UNITED STATES PATENT OFFICE 1,999,945

STORAGE BATTERY

Raymond E. Rathburn, Green Bay, Wis.

Application June 6, 1933, Serial No. 674,563

2 Claims. (Cl. 136—171)

This invention relates broadly to storage batteries, and more particularly to motor vehicle batteries and boxes, having as its object to provide connecting devices for the battery terminals for establishing the usual circuit connections with the battery in such a manner that the battery may be slipped from the box and removed from the vehicle without the necessity of detaching any circuit wires.

Further, it is an object of the present invention to provide for automatically making or breaking the terminal connections without the use of tools and to otherwise eliminate the objections to batteries now in use and that render the removal of the battery difficult, especially among which is corrosion and the deleterious effects thereof.

The invention, together with its numerous objects and advantages will be best understood from a study of the following description taken in connection with the accompanying drawings wherein is illustrated a preferred embodiment of the invention.

It is to be understood at the outset that it is in no wise intended to restrict the invention to the precise embodiment herein illustrated and described, other than may be necessary to meet the requirements of the prior art and the scope of the appended claims.

In the drawings:

Figure 2 is a vertical sectional view through the box with portions of the battery broken away for illustrating certain details of construction being hereinafter more fully referred to.

Figure 1:
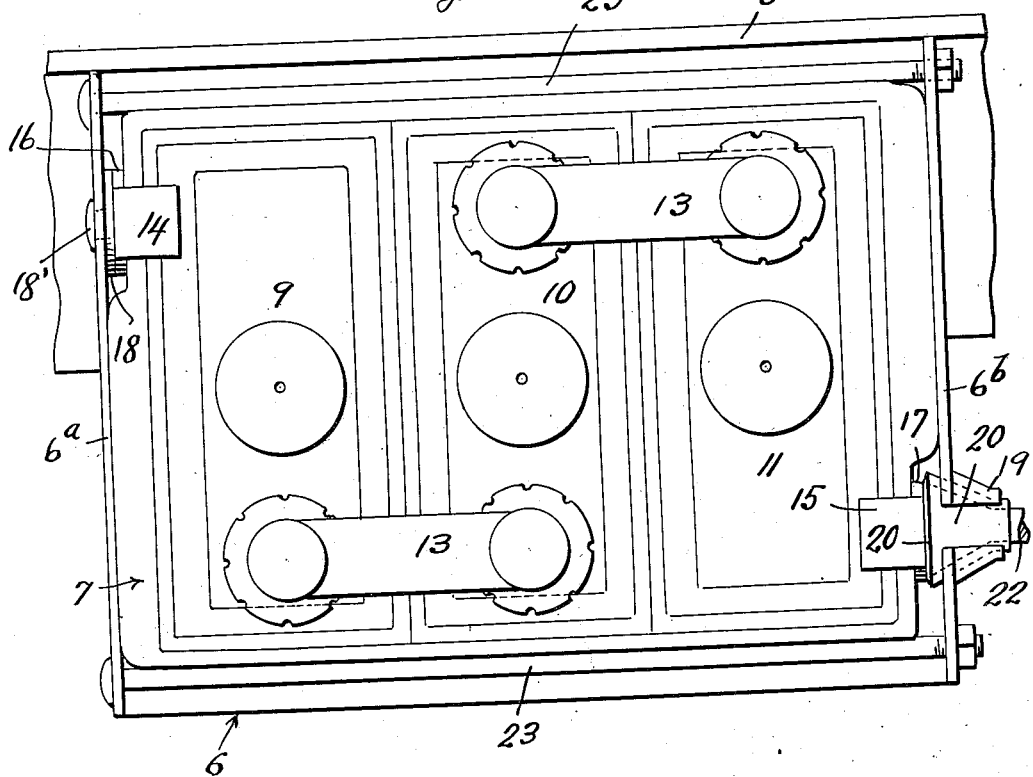
Figure 1 is a top plan view of an automobile battery and supporting box therefor illustrating my improved terminal connection.
Figure 4:
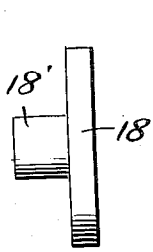
Figure 4 is a side elevational view of a ground contact.
Figure 5:
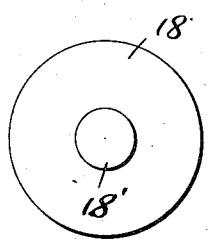
Figure 5 is a plan view of said contact.

Referring to the drawings by reference numerals, it will be seen that 5 indicates generally a portion of a chassis frame bar or other suitable part of an automobile chassis while the reference numeral 6 designates generally a conventional box mounted on the part 5 for receiving the battery designated as a whole by the reference numeral 7.

The battery 7 includes among other parts a container 8 of rubber or other suitable material, and arranged in the container are the battery cells, which cells are three in number and designated by the reference numerals 9, 10, and 11, respectively. The battery cells are separated by partitions 12. The cells are shown connected in series in the usual manner by the bars 13.

Figure 2:
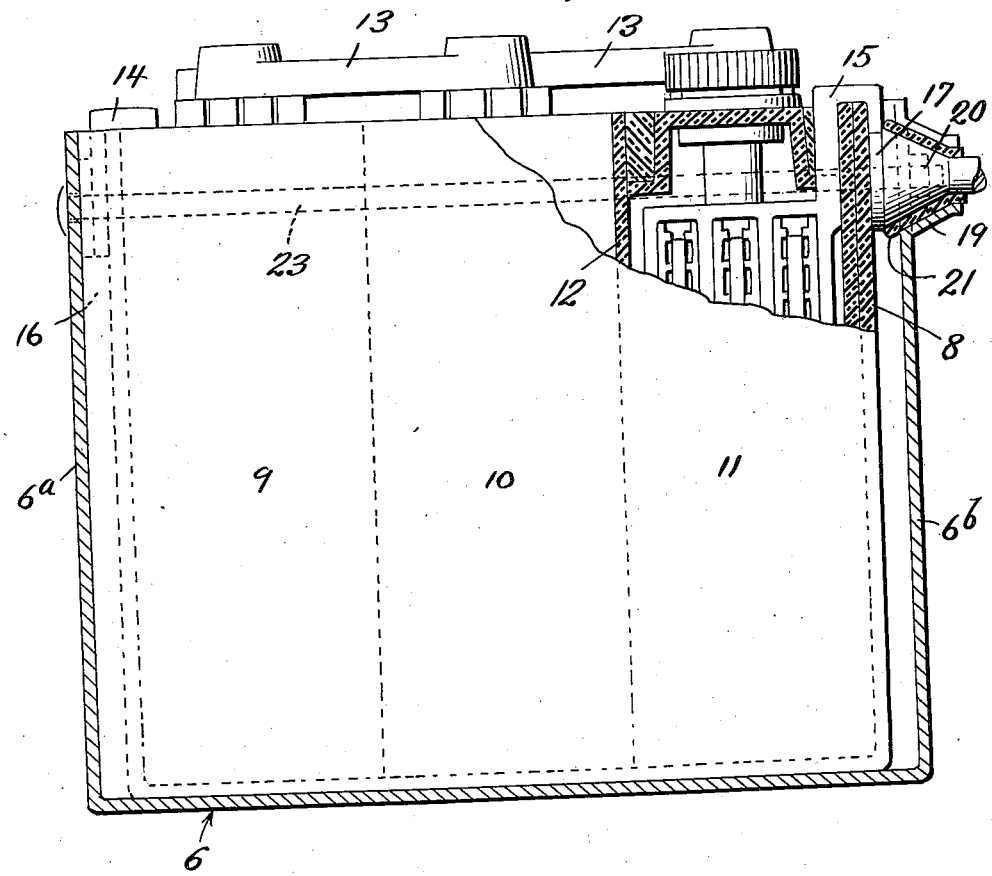
Figure 3:
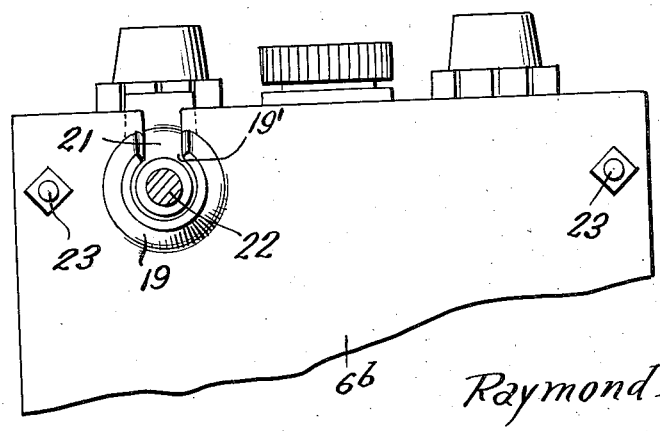
Figure 3 is a fragmentary end elevational view of the battery and box therefor.

In accordance with the present invention, instead of having the cells 9 and 11 provided with the usual type of frusto-conical terminal posts, said cells are respectively provided with terminal posts 14 and 15, respectively, and, as shown in the drawings, each of the terminals 14 and 15 is of substantially inverted U-shape and straddles an end wall of the container 10 in a manner clearly shown in Figure 2. The outer sides or legs of the terminals 14 and 15 are provided with flat disk-like heads 16 and 17.

A ground contact disk 18 has integral therewith a stud or rivet 18' that is engaged with one side 6a of the box 6 for securing the contact 18 to the inner side of the wall 6a of the box, the free end of the rivet 18' being upset as shown in Figure 1. The contact 18 is so located on the side 6a of the box as to be engaged with the head 16 of the terminal 14 when the battery is slid into the box 6 as will be clear from a study of the drawings.

The wall 6b of the box 6 in the region of the terminal 15 has its upper edge split vertically, the split extending from the upper edge of the box to a substantially circular opening 19'. The said wall or side 6b of the box about the opening 19' has integral therewith a longitudinally split frusto-conical socket forming flange 19 in which is fitted snugly a substantially frusto-conical contact member 20 that is insulated from the flange 19 and wall 6a of the box by a suitable sleeve of insulating material 21. The largest end of the contact 20 extends inwardly of the box 6 to be engaged by the head 17 of the terminal 15 when the battery is slid into the box. The terminal 20 is provided on one end of a cable or circuit wire 22.

It will now be observed that the contacts 18 and 20 on the sides of the box 6 are so disposed to be electrically engaged with the heads 16 and 17 of the terminals 14 and 15 when the battery 7 is slid down into the box 6 to close the circuit through the battery.

The battery boxes now employed on vehicles for holding the battery usually have the sides thereof connected by tie rods, and in the present instance, I have shown the sides 6a and 6b of the box 6 connected by tie rods 23. Thus with this type of box, a positive connection between the contacts on the walls 6a, 6b of the box and the terminals 14 and 15 will be made upon tightening up of the nuts provided on one end of the tie bolts or rods 23 after the battery has been placed within the box. Also this tightening up of the nuts on the bolts 23 for drawing the sides 6a and 6b of the box inwardly will result in the conical terminal 20 being forced into a wedging fit within the socket flange 19. Thus a positive electrical connection will be made, and at the same time provision is made for establishing the usual circuit connections with the battery in such a manner that the battery may be slipped from the box and removed from the vehicle without the necessity of detaching any circuit wires.

What is claimed is:

1. A battery carrier receptacle, a flat disk-like contact on one end wall of said receptacle, and a socket on a relatively opposite end wall of the receptacle, a conical contact member having a wedging fit within said socket, and a battery for disposition within said carrier receptacle provided with terminals positioned for intimate contact with the contacts on the walls of the receptacle upon disposition of the battery within said receptacle.

2. In combination, an electrical battery having a terminal provided with a disk like head lying flat against the outer face of the adjacent end wall of the battery, and a carrier receptacle receiving said battery, said carrier receptacle having an end wall provided with an integral conical socket and a slit extending downwardly from the upper edge of said end wall to the largest end of the socket and continuing longitudinally of said socket, and a conical contact member fitted within said socket and engageable with the head of the terminal.

RAYMOND E. RATHBURN.